Oct. 20, 1970     E. D. NIELSEN     3,534,620

VALVE ROTATOR

Filed Dec. 19, 1968     2 Sheets-Sheet 1

INVENTOR.

Erhard D. Nielsen

BY

S.C. Thorpe

ATTORNEY 3,534,620
VALVE ROTATOR
Erhard D. Nielsen, Grand Rapids, Mich., assignor to General Motors Corporation, Detroit, Mich., a corporation of Delaware
Filed Dec. 19, 1968, Ser. No. 785,281
Int. Cl. F01l 1/32; F16k 29/00
U.S. Cl. 74—88                                                      7 Claims

ABSTRACT OF THE DISCLOSURE

A coil spring returned and push rod and rocker actuated poppet valve having its stem slidably and rotatably guided in an engine cylinder head, including a valve rotator interposed between the coil spring and cylinder head and comprising a Belleville spring fulcruming on resiliently supported sprags which deflect under increasing compressive load during valve opening to induce rotation of the coil spring and valve.

BACKGROUND OF THE INVENTION

Field of the invention

This invention relates to reciprocating elements such as internal combustion engine poppet valves, and particularly to means for inducing concurrent rotation thereof comprising a Belleville spring fulcrumed on resiliently tiltable elements and acting as a brake to limit rotation to a single direction. The structure providing the fulcruming and tilting action may take various forms, including a ring of rubber-like material with integral upstanding sections, or a series of individual circumferentially spaced rubber-like sections, with or without tiltable rigid elements between the rubber-like sections.

Description of the prior art

Prior valve rotator devices are known which employ a Belleville spring and fulcruming means therefor which act under increased thrust load during opening movement of the valve to free the valve return spring and valve for rotation. The U.S. Pat. No. 2,827,885 to Graham shows one such arrangement wherein an oil film under the Belleville spring serves as the fulcruming means. U.S. Pat. No. 2,758,583 to Norton is representative of such rotators in which the Belleville spring fulcrums on a garter spring whose individual coils undergo a tilting action under the increased loading and thereby serve to impart positive rotation of the valve. In the U.S. Pat. No. 2,835,236 to Dadd the Belleville spring fulcrums on a rigid metal ring, and the valve opening force is transmitted to it through a plurality of circumferentially spaced rockers or pins which likewise tilt under the increased loading to impart rotation to the valve.

SUMMARY OF THE INVENTION

My invention distinguishes from such prior valve rotators in providing novel and unique fulcruming means for the Belleville spring. More particularly, elastic rubber-like material is used therein, which may be employed as a molded one-piece ring-like member or as a series of individual molded sections spaced circumferentially of each other about the axis of valve stem. Where added stiffness is desired, metal plates or other wafer-like members of rigid material may be incorporated therein to act as tiltable levers resiliently supported by the rubber-like material.

DESCRIPTION OF THE PREFERRED EMBODIMENTS

Figure 1:
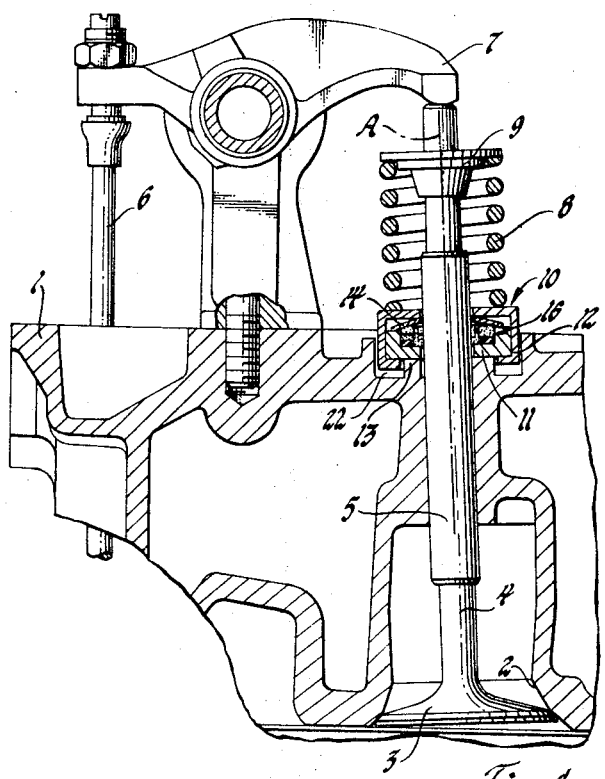
FIG. 1 shows, in section, a valve rotator embodying the invention and located below the coil return spring of a push rod and rocker actuated poppet valve which is guided for axial reciprocation and rotation in an engine cylinder head.
Figure 3:
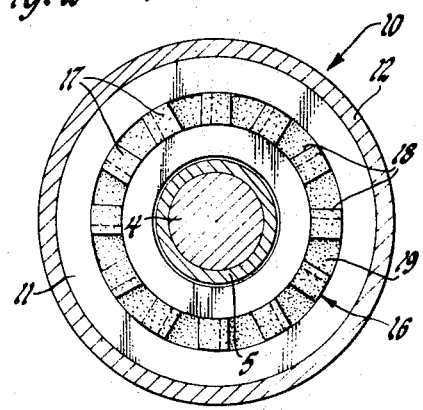
FIG. 3 is a sectional view taken substantially along the line 3—3 of FIG. 2, FIGS. 4 and 5, 6 and 7, 8 and 9, and 10 and 11, are views similar to FIGS. 2 and 3, respectively, but showing different modified forms of the valve rotator.

Referring now in detail to the drawings, and first to FIGS. 1 and 3, the numeral 1 designates the cylinder head of an internal combustion engine having a valve port 2 closeable by a poppet valve 3, shown in closed position. The stem 4 of the valve is slidably mounted for reciprocation in a guide 5 fixed in the head, the guide also accommodating rotation of the valve stem about its longitudinal axis indicated by line A. Reciprocation of the valve, as shown, is effected in conventional manner by a push rod 6 and rocker 7 in combination with a coil return spring 8 whose upper end bears against keeper means 9 fixed to the stem. Interposed between the lower end of the return spring and the cylinder head is shown a valve rotator designated generally by the numeral 10 and embodying the invention.

Figure 2:
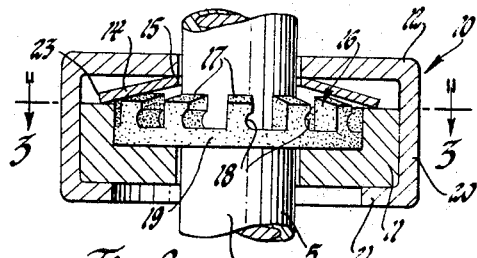
FIG. 2 is an enlarged view of the rotator shown in FIG. 1, the rubber-like material thereof being illustrated in elevation.

As is more clearly shown in FIGS. 2 and 3, the rotator comprises a fixed lower annular member 11 and a relatively rotatable upper annular member 12. The lower member 11 is adapted to rest on a boss portion 13 (FIG. 1) of the cylinder head, and the upper member 12 supports the lower end of the coil return spring 8. Interposed between the members 11 and 12 is a Belleville spring 14, shown in its normally dished configuration wherein its inner and axially disposed upper end 15 abuts the underside of the member 12, and its outer and axially lower end 23 abuts the lower member 11 when the poppet valve is in its closed position. Interposed, in turn, between the Belleville spring and the lower member 11 is means 16 which serves as a fulcrum for the Belleville spring during its deflection under the increased loading that accompanies opening movements of the valve. It will be noted that the means 16 has a plurality of upstanding segmental sections 17 arranged in circumferentially spaced apart relation about the valve stem 4. These segmental sections are of an elastic rubber-like material, each having one corresponding side 18 thereof relieved so as to reduce the compressive resistance of the sections and thereby induce a bodily movement or tilting thereof in operation. In the particular arrangement shown in FIGS. 2 and 3, each of the sections 17 are integrally associated at their lower ends with an annular body 19 of the same elastic rubber-like material. Also, it will be seen that the relief of the sides 18 of the sections is effected by giving those sides a generally C-shaped configuration, whereas the opposite sides of each section extends generally vertically with the valve stem axis. In order to return the parts 11, 12, 14 and 16 or the rotator in assembled relation when separated from the engine, the upper member 12 has side walls 20 whose lower portions are crimped or spun over beneath the lower member 11 as illustrated at 21. An annular recess, as shown at 22 in FIG. 1, may be provided in the cylinder head to accommodate axial movement of the upper member and its side walls with deflection of the Belleville spring.

In operation, as the poppet valve 3 is moved downwardly from its closed position shown in FIG. 1, compressing the valve return spring 8, the increased thrust of the return spring is transmitted through the upper member 12 of the rotator against the inner and upper end 15 of the Belleville spring. Initially under such increased thrust loading, the outer and lower end of the Belleville spring is supported by the lower member 11 of the rotator which rests on the cylinder head boss 13. The rubber-like material sections 17, however, also react against such downward loading of the Belleville spring and act as a fulcrum therefor, resulting in the end 23 being displaced out of engagement with the lower member 11. During such action while the fulcrum sections 17 are supporting the Belleville spring, these sections, by reason of their corresponding sides 18 being relieved to reduce their compressive resistance, all undergo a bodily movement or tilting which imparts rotation to the Belleville spring in a counterclockwise direction as viewed in FIG. 3. Such rotation is, in turn, transmitted through the upper member 12, the coil spring and keeper means 9 to the valve stem 4. Depending on the inherent stiffness of the rubber-like material in relation to the compressive loading of the sections 17, and the extent to which their sides 18 are relieved, there will be a greater or lesser extent of such rotation before the lower end of the Belleville spring again engages the member 11. On the return stroke of the valve the Belleville spring flexes back to its dished configuration, with the lower end 23 remaining in engagement with the member 11 to prevent retrograde rotation of the valve, and the rubber-like sections 17 return to their upright positions.

Figure 4:
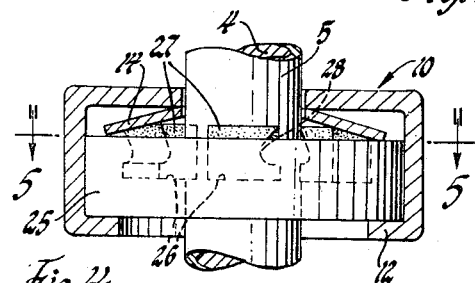
Figure 5:
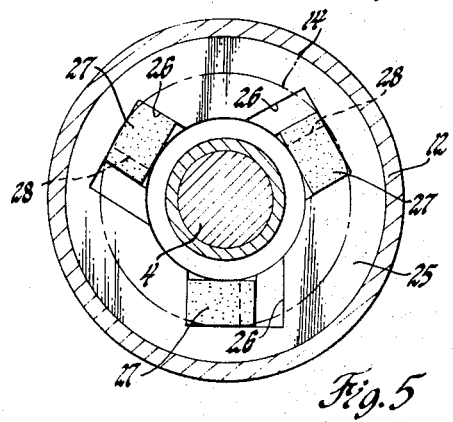

The modified form of the rotator shown in FIGS. 4 and 5 differs structurally in that the lower annular member 25 is provided with a series (three being shown) of circumferentially spaced recesses 26 facing the Belleville spring, and in each thereof is seated an individual section 27 of elastic rubber-like material on which the Belleville spring 14 fulcrums. As in the previously described embodiment, corresponding sides 28 of these sections are relieved as by forming them with a C-shaped configuration. The operation is the same as that previously described for FIGS. 2 and 3.

Figure 6:
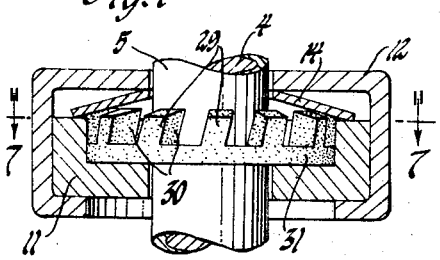
Figure 7:
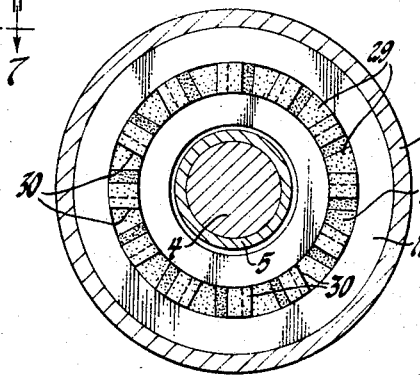

In FIGS. 6 and 7, there is shown a still further embodiment which is generally similar to that of FIGS. 2 and 3 except that the segmental sections 29 are correspondingly inclined circumferentially about the valve. Such inclination accomplishes the same effect therein described of relieving the corresponding sides 30 of these sections so as to induce their bodily tilting movement under compressive loading by the Belleville spring 14. The lower end of the sections 29 are integrally joined as a one piece member with an annular body 31 of the same rubber-like material, in the same manner as in the embodiment of FIGS. 2 and 3.

Figure 8:
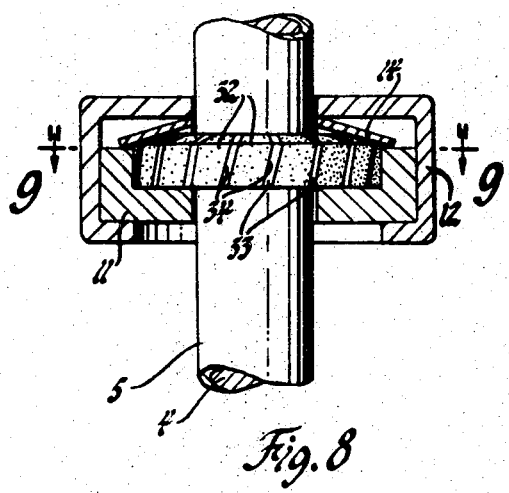
Figure 9:
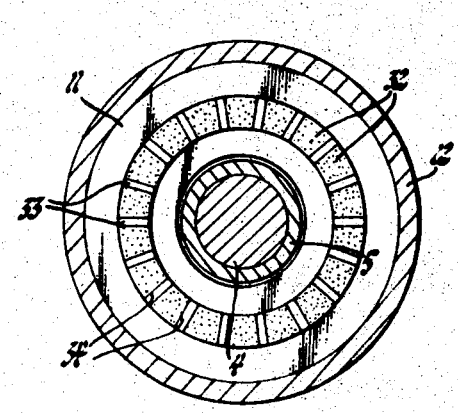

In the modification shown in FIGS. 8 and 9, the segmental sections 32 are correspondingly inclined about the valve stem 4, and in the space between each adjacent pair of sections is a plate- or wafer-like member 33 which extends upwardly into abutting engagement with the Belleville spring 14 and downwardly into abutting engagement with the lower member 11 of the rotator. As in the FIGS. 6, 7 embodiment, the inclination of these sections 32 serves to provide the relief of their corresponding sides 34, which, together with the corresponding inclination of the wafer-like members, induces bodily tilting movement of both thereof during increased compressive loading, and consequent unidirectional rotation of the Belleville spring and valve.

Figure 10:
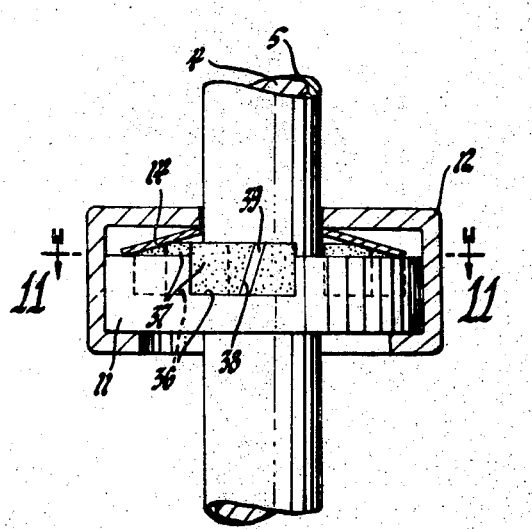
Figure 11:
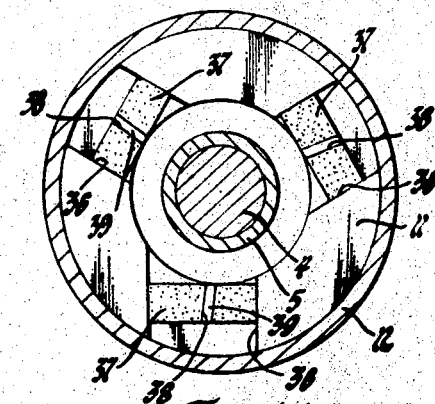

The embodiment shown in FIGS. 10 and 11 employs a lower annular member 11 having a series (three being shown) of individual recesses 36 facing the Belleville spring. Seated in each of these recesses is a segmental section 37 of the same elastic rubber-like material, each having a slot 38 therein extending generally longitudinally of the valve stem, but inclined in a direction circumferentially thereof. Substantially filling each such slot is a plate- or wafer-like member 39 of rigid material arranged similarly to the members 33 in the preceding embodiment of FIGS. 8 and 9. The operation, again, is similar in all respects to that previously described for the other forms.

What is claimed is:

1. A device for insertion in thrust transmitting relation between two parts to induce their relative rotation about an axis in response to relative movement of the parts along said axis, comprising a fixed annular member, a second annular member coaxially movable toward and rotatable relative to said fixed member, a Belleville spring interposed coaxially between said members, said spring having one of its axially disposed ends abutting one of the members and its opposite end normally abutting but movable out of abutment with the other of said members in response to flexure of the spring in operation, and fulcrum means reacting against the fixed member and resiliently supporting the spring during said flexure, said means comprising circumferentially spaced segmental sections of elastic rubber-like material, one corresponding side of each of said sections opposite the section adjacent thereto being relieved to reduce its compressive resistance, whereby bodily displacement of said sections occurs unidirectionally during flexure of the spring and induces rotation of the spring and said second member after said opposite end of the spring moves out of abutment with the fixed member.

2. The invention of claim 1, wherein said fulcrum means comprises an annular body of elastic rubber-like material having said segmental sections integrally associated therewith as a one-piece member, said corresponding sides of said sections being C-shaped to provide said relief and reduction of compressive resistance.

3. The invention of claim 1, wherein said fixed member is provided with circumferentially spaced recesses facing the Belleville spring, said segmental sections being individually seated in said recesses, said corresponding sides of said sections being C-shaped to provide said relief and reduction of compressive resistance.

4. The invention of claim 1, wherein said sections are correspondingly inclined circumferentially of said axis, the inclination of each of said sections providing said relief of its said one corresponding side and reduction of its compressive resistance.

5. The invention of claim 4, including an annular body of elastic rubber-like material seated against said fixed member, said body being integrally associated as a one-piece member with the ends of said sections remote from the Belleville spring.

6. The invention of claim 4, including wafer-like members of rigid material correspondingly inclined with and interposed between respective adjacent pairs of said sections, said wafer-like members having abutting engagement with the Belleville spring and substantially filling the spaces between said sections adjacent thereto.

7. The invention of claim 1, wherein said fixed member is provided with circumferentially spaced recesses facing the Belleville spring, said segmental sections being individually seated in said recesses, each of said sections having a slot extending therethrough in a direction generally longitudinally of said axis, said slots being correspondingly inclined circumferentially about said axis, and including wafer-like members of rigid material substantially filling said slots, each of said wafer-like members having abutting engagement with the bottom of its associated recess and with the Belleville spring.

References Cited

UNITED STATES PATENTS

| | | | | |
|---|---|---|---|---|
| 1,644,913 | 10/1927 | Burgess et al. | | |
| 2,758,583 | 8/1956 | Norton | | 123—90 |
| 2,827,029 | 3/1958 | Norton | | 123—90 |
| 2,835,236 | 5/1958 | Dadd | | 123—90 |
| 2,855,913 | 10/1958 | Geer | | 123—90 |
| 3,421,734 | 1/1969 | Updike et al. | | 251—337 |

AL LAWRENCE SMITH, Primary Examiner

U.S. Cl. X.R.

123—90; 137—331; 251—337